(12) United States Patent
Shimazu et al.

(10) Patent No.: US 9,862,273 B2
(45) Date of Patent: Jan. 9, 2018

(54) WORK VEHICLE AND WORK VEHICLE DISPLAY DEVICE

(71) Applicant: Komatsu Ltd., Tokyo (JP)

(72) Inventors: Mitsuhiro Shimazu, Fujisawa-shi (JP); Hayato Matsumoto, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 220 days.

(21) Appl. No.: 14/372,813

(22) PCT Filed: Feb. 18, 2014

(86) PCT No.: PCT/JP2014/053814
§ 371 (c)(1),
(2) Date: Jul. 17, 2014

(87) PCT Pub. No.: WO2015/025537
PCT Pub. Date: Feb. 26, 2015

(65) Prior Publication Data
US 2015/0246613 A1     Sep. 3, 2015

(51) Int. Cl.
*F01N 11/00* (2006.01)
*B60K 35/00* (2006.01)
(Continued)

(52) U.S. Cl.
CPC ............ *B60K 35/00* (2013.01); *B60K 13/04* (2013.01); *F01N 3/10* (2013.01); *F02D 29/02* (2013.01);
(Continued)

(58) Field of Classification Search
CPC .... F01N 3/18; F01N 11/00; F01N 3/10; E02F 9/267; E02F 9/26; E02F 2041/0235;
(Continued)

(56) References Cited

U.S. PATENT DOCUMENTS 7,143,756 B2    12/2006    Kojima et al.
8,847,745 B2    9/2014     Shibamori et al.
(Continued)

FOREIGN PATENT DOCUMENTS

CN    103154391 A    6/2013
EP    1816267 A1    8/2007
(Continued)

OTHER PUBLICATIONS

International Search Report dated May 27, 2014, issued for PCT/JP2014/053814.

*Primary Examiner* — Hung Q Nguyen
*Assistant Examiner* — Xiao Mo
(74) *Attorney, Agent, or Firm* — Locke Lord LLP (57) ABSTRACT

A work vehicle including an internal combustion engine that generates power and an exhaust gas treatment device that treats exhaust gas emitted from the internal combustion engine, the work vehicle includes: a detection unit that detects an abnormality of the exhaust gas treatment device; an output restriction unit that restricts output of an output generation device included in the work vehicle when the detection unit detects the abnormality of the exhaust gas treatment device; a display control unit that causes a display unit to display information that the restriction on the output is allowed to be temporarily released; and a releasing unit that releases the restriction on the output in response to an instruction to temporarily release the restriction on the output.

14 Claims, 5 Drawing Sheets

(51) Int. Cl.
  *F02D 29/02* (2006.01)
  *F02D 41/02* (2006.01)
  *B60K 13/04* (2006.01)
  *F01N 3/10* (2006.01)
  *G07C 5/08* (2006.01)
  *G08B 5/36* (2006.01)
  *F02D 41/22* (2006.01)
  *F01N 3/20* (2006.01)

(52) U.S. Cl.
  CPC ....... *F02D 41/0235* (2013.01); *G07C 5/0808* (2013.01); *G08B 5/36* (2013.01); *F01N 3/2066* (2013.01); *F01N 11/00* (2013.01); *F01N 2550/00* (2013.01); *F01N 2590/08* (2013.01); *F02D 2041/227* (2013.01); *F02D 2041/228* (2013.01); *F02D 2200/604* (2013.01)

(58) Field of Classification Search
  CPC ..... B60K 13/04; B60K 35/00; F02D 41/0235; F02D 29/02
  See application file for complete search history.

(56) References Cited

U.S. PATENT DOCUMENTS

| | | | | |
|---|---|---|---|---|
| 2007/0213855 | A1* | 9/2007 | Furuno | E02F 9/26 700/83 |
| 2013/0176120 | A1* | 7/2013 | Shibamori | E02F 9/267 340/438 |
| 2014/0277995 | A1* | 9/2014 | Slaton | F01N 11/00 701/102 |

FOREIGN PATENT DOCUMENTS

| | | |
|---|---|---|
| JP | 2003-254048 A | 9/2003 |
| JP | 2003-529011 A | 9/2003 |
| JP | 2009-127521 A | 6/2009 |
| JP | 2009-257323 A | 11/2009 |
| JP | 2011-094597 A | 5/2011 |
| JP | 2012-145083 A | 8/2012 |
| JP | 2013-194548 A | 9/2013 |
| WO | WO-00/75643 A1 | 12/2000 |

* cited by examiner

WORK VEHICLE AND WORK VEHICLE DISPLAY DEVICE

FIELD

The present invention relates to a work vehicle, and a work vehicle display device included in a work vehicle for displaying various pieces of information.

BACKGROUND

Some work vehicles such as an excavator and a dump truck include an internal combustion engine such as a diesel engine as a power generation source. Form the viewpoint of reducing environmental load, it is required to clean exhaust gas emitted from the internal combustion engine before emission. Hence, some work vehicles include a device to clean the exhaust gas.

Patent Literature 1 describes that the device is arranged in an exhaust passage of the engine and includes a reduction catalyst for reducing and cleaning nitrogen oxides in the exhaust gas with a reducing agent, and driving restriction control to restrict the driving of the work vehicle is implemented if the amount of remaining precursor of the reducing agent decreases to or below a predetermined amount. The driving restriction control is described which makes the restart of the engine impossible.

CITATION LIST

Patent Literature

Patent Literature 1: Japanese Patent Application Laid-open No. 2009-127521

SUMMARY

Technical Problem

The technology described in Patent Literature 1 restricts the driving of the work vehicle if the amount of remaining precursor of the reducing agent decreases to or below the predetermined amount. However, if the restart of the engine becomes impossible at this point in time, the work vehicle cannot be moved in cases such as it is desired to be moved, and inconvenience may occur.

An object of the present invention is to reduce inconvenience occurring due to an output restriction in a work vehicle including an internal combustion engine at least when the output of the internal combustion engine is restricted.

Solution to Problem

According to the present invention, a work vehicle including an internal combustion engine that generates power and an exhaust gas treatment device that treats exhaust gas emitted from the internal combustion engine, the work vehicle comprises: a detection unit that detects an abnormality of the exhaust gas treatment device; an output restriction unit that restricts output of an output generation device included in the work vehicle when the detection unit detects the abnormality of the exhaust gas treatment device; a display control unit that causes a display unit to display information that the restriction on the output is allowed to be temporarily released; and a releasing unit that releases the restriction on the output in response to an instruction to temporarily release the restriction on the output.

In the present invention, it is preferable that the display control unit causes the display unit to alternately display a first image including output restriction information that the output restriction unit is restricting the output, and a second image including information that the restriction on the output is allowed to be temporarily released.

In the present invention, it is preferable that the allowable number of times for the temporary releasing of the restriction on the output is predetermined, and the display control unit causes the display unit not to display the information that the restriction on the output is allowed to be temporarily released when the restriction on the output is not allowed to be temporarily released.

In the present invention, it is preferable that the allowable number of times for the temporary releasing of the restriction on the output is predetermined, and the display control unit causes the display unit to display the allowable number of times for the temporary releasing of the restriction on the output.

In the present invention, it is preferable that the allowable amount of time for the temporary releasing of the restriction on the output is predetermined, and the display control unit counts an amount of time the restriction on the output is temporarily released and causes the display unit to display remaining time information indicating remaining time the restriction on the output is allowed to be temporarily released.

According to the present invention, a work vehicle including an internal combustion engine that generates power and an exhaust gas treatment device that treats exhaust gas emitted from the internal combustion engine, the work vehicle comprises: a detection unit that detects an abnormality of the exhaust gas treatment device; an output restriction unit that restricts output of an output generation device included in the work vehicle when the detection unit detects the abnormality of the exhaust gas treatment device; a display control unit that causes a display unit to alternately display a first image including output restriction information that the output restriction unit is restricting the output, and remaining time until the output is restricted to the lowest state, and a second image including information that the restriction on the output is allowed to be temporarily released; and a releasing unit that releases the restriction on the output in response to an instruction to temporarily release the restriction on the output.

According to the present invention, a work vehicle display device included in a work vehicle having: an internal combustion engine that generates power; an exhaust gas treatment device that treats exhaust gas emitted from the internal combustion engine; a detection unit that detects an abnormality of the exhaust gas treatment device; an output restriction unit that restricts output of an output generation device included in the work vehicle when the detection unit detects the abnormality of the exhaust gas treatment device; and a releasing unit that releases the restriction on the output in response to an instruction to temporarily release the restriction on the output, wherein the work vehicle display device displays information that the restriction on the output is allowed to be temporarily released.

In the present invention, it is preferable that the work vehicle display device displays alternately an image including information on the abnormality of the exhaust gas treatment device and an image including the information that the restriction on the output is allowed to be temporarily released.

In the present invention, it is preferable that the allowable number of times for the temporarily releasing of the restriction on the output is predetermined, and the work vehicle display device does not display the information that the restriction on the output is allowed to be temporarily released when the restriction on the output is not allowed to be temporarily released.

In the present invention, it is preferable that the allowable number of times for the temporary releasing of the restriction on the output is predetermined, and the work vehicle display device displays the allowable number of times for the temporary releasing of the restriction on the output.

In the present invention, it is preferable that the allowable amount of time for the temporary releasing of the restriction on the output is predetermined, and the display control unit counts an amount of time the restriction on the output is temporarily released, and the work vehicle display device displays remaining time the restriction on the output is allowed to be temporarily released.

According to the present invention, a work vehicle display device included in a work vehicle having: an internal combustion engine that generates power; an exhaust gas treatment device that treats exhaust gas emitted from the internal combustion engine; a detection unit that detects an abnormality of the exhaust gas treatment device; an output restriction unit that restricts output of an output generation device included in the work vehicle when the detection unit detects the abnormality of the exhaust gas treatment device; and a releasing unit that releases the restriction on the output in response to an instruction to temporarily release the restriction on the output, wherein the work vehicle display device causes a display unit to alternately display a first image including output restriction information that the output restriction unit is restricting the output and remaining time until the output is restricted to the lowest state, and a second image including information that the restriction on the output is allowed to be temporarily released.

The present invention can reduce inconvenience occurring due to an output restriction in a work vehicle including an internal combustion engine at least when the output of the internal combustion engine is restricted.

BRIEF DESCRIPTION OF DRAWINGS

FIG. 8 is a flowchart illustrating an example of a process of releasing a restriction on the output of an engine or the like.

DESCRIPTION OF EMBODIMENTS

A mode for carrying out the present invention (an embodiment) will be described in detail with reference to the drawings.

<Work Vehicle 1>

Figure 1:
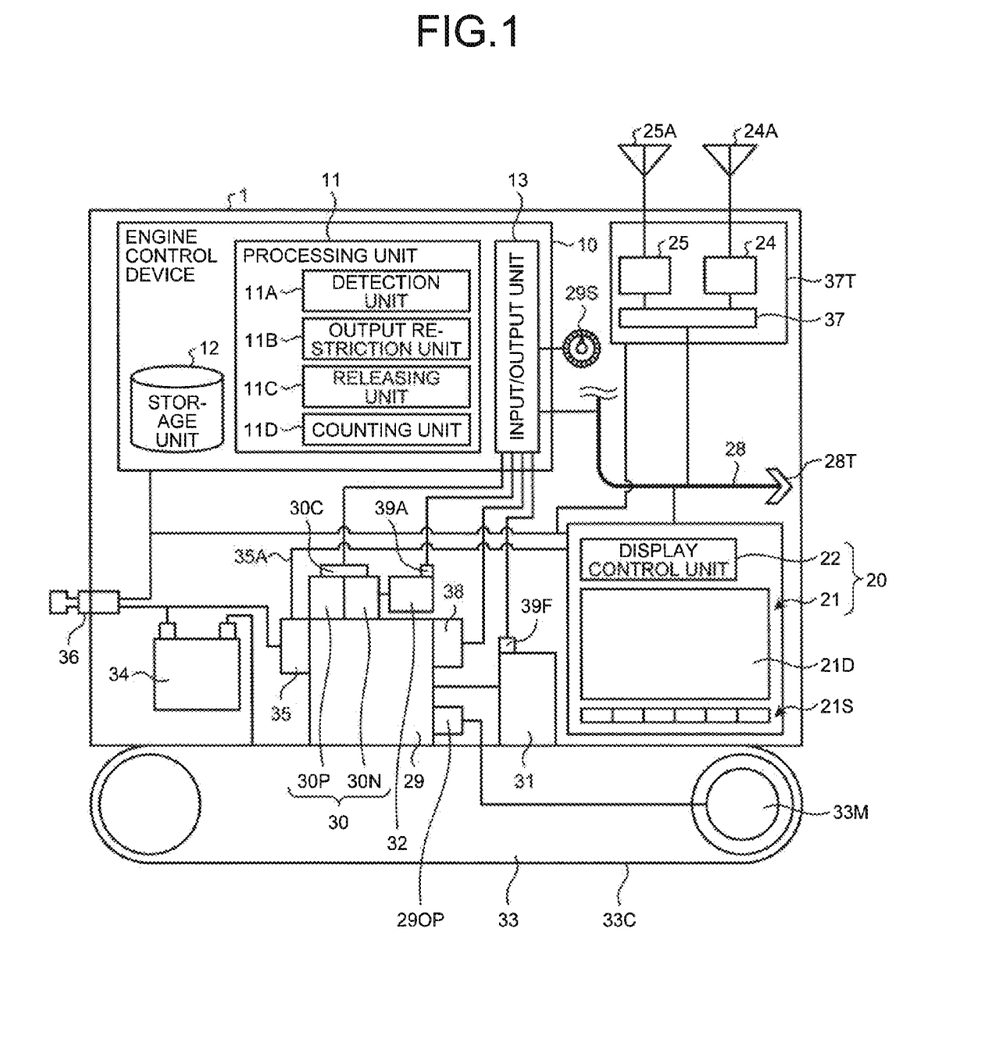
FIG. 1 is a diagram illustrating an example of a work vehicle according to the embodiment.

FIG. 1 is a diagram illustrating an example of a work vehicle 1 according to the embodiment. The work vehicle 1 is, for example, an excavator, a dump truck, a wheel loader, a bulldozer, or a forklift, but not limited to them. The work vehicle 1 includes an engine control device 10 as a control device, a monitor 20 as a work vehicle display device, an engine 29 as an internal combustion engine, and an exhaust gas treatment device 30 that treats exhaust gas emitted from the engine 29. In addition, the work vehicle 1 includes a communication device 24, a position detection device 25, the engine control device 10, an in-vehicle signal line 28, a fuel tank 31, a urea solution tank 32, a travel device 33, a storage battery 34, an alternator 35, a key switch 36, an information collecting device 37, a rotating speed detection sensor 38, and liquid level detection sensors 39F and 39A as detectors that detect the volume of liquid. For example, an ultrasonic sensor that can find the height of the surface of the liquid by detecting a float floating on the liquid can be used as the detector that detects the volume of the liquid. Moreover, another detector such as a liquid volume sensor that does not detect the surface of the liquid but directly measures the volume of the liquid may be used to detect the volume of the liquid.

(Engine Control Device 10)

The engine control device 10 controls the engine 29 and the exhaust gas treatment device 30. The engine control device 10 includes a processing unit 11, a storage unit 12, and an input/output unit 13. The processing unit 11 is, for example, a combination of a central processing unit (CPU) and a memory. The storage unit 12 is, for example, a random access memory (RAM), a read only memory (ROM), a flash memory, a hard disk drive, or the like, or a combination thereof. A computer program, data, and the like that are necessary for the processing unit 11 to execute various processes such as the control of the engine 29 and the control of the exhaust gas treatment device 30 are stored in the storage unit 12. Next, the processing unit 11 is described in more detail.

As illustrated in FIG. 1, the processing unit 11 includes a detection unit 11A, an output restriction unit 11B, a releasing unit 11C, and a counting unit 11D. The detection unit 11A detects abnormalities of the exhaust gas treatment device 30. The abnormalities of the exhaust gas treatment device 30 include, for example, a reduction in the amount of remaining urea solution, an abnormality of a device that injects the urea solution, filter clogging, and abnormalities of various sensors. The output restriction unit 11B restricts the output of an output generation device included in the work vehicle 1 if the detection unit 11A detects an abnormality of the exhaust gas treatment device 30. The output generation device includes, for example, the engine 29 and a hydraulic pump 29OP. Moreover, a motor serves as the output generation device in an excavator that swings an upper structure by the motor, a dump truck that drives wheels by the motor, or the like. If the output of the output generation device is restricted, the output restriction unit 11B implements any of a restriction on the output of the engine 29, a restriction on the output of the hydraulic pump 29OP (absorbing torque), and a restriction on the output of both the engine 29 and the hydraulic pump 29OP. If the output of the output generation device is restricted, the output restriction unit 11B restricts the output of the engine 29 by at least one of the kind or level of an abnormality.

The releasing unit 11C releases an output restriction at the instruction to temporarily release the output restriction. The instruction is generated, for example, by the monitor 20 that has accepted the input (signal) of the instruction to temporarily release the output restriction. The above-mentioned input is provided by an operator of the work vehicle 1 from an input device 21S of the monitor 20. If the releasing unit 11C releases the output restriction by the output restriction unit 11B, the processing unit 11 releases the output restriction by the output restriction unit 11B to control the engine 29 and/or the like during a predetermined period of time (for example, 30 minutes).

If the key switch 36 is turned off to stop the engine 29, the state where the output restriction is being released can prematurely be terminated. In this manner, if the key switch 36 is turned off before the passage of the predetermined period of time, it results in that the output restriction has been released once, the releasing of the output restriction being described below. As described above, it may be configured such that if the output restriction is released once, and the releasing of the output restriction is terminated before the passage of the predetermined period of time, the amount of time the output restriction has been released is stored to release the output restriction during the stored amount of time at the next releasing of the output restriction. Alternatively, as described above, it may be configured such that if the output restriction is released once, and the releasing of the output restriction is terminated before the passage of the predetermined period of time, the amount of time the output restriction has been released is not stored and the output restriction is released again during the predetermined period of time at the next releasing of the output restriction.

The counting unit 11D counts the amount of time or number of times. For example, the counting unit 11D counts the amount of time and number of times that the releasing unit 11C releases the output restriction, the amount of time before the output restriction unit 11B restricts output, and the like. The amount of time before the output restriction unit 11B restricts output can be obtained, for example, based on the remaining amount of the urea solution accumulated in the urea solution tank 32.

The input/output unit 13 of the engine control device 10 is electrically connected to the in-vehicle signal line 28. In the embodiment, the engine 29 controlled by the engine control device 10 is a diesel engine. The engine 29 is not limited to a diesel engine, but is simply required to be an internal combustion engine. The engine 29 drives the hydraulic pump 29OP and supplies the hydraulic fluid to a hydraulic component included in the work vehicle 1. The hydraulic pump 29OP is, for example, a swash-plate hydraulic pump, and can change the amount of hydraulic fluid to be discharged by changing the angle of the awash plate. The type of the hydraulic pump 29OP is not limited to the awash plate type.

The exhaust gas treatment device 30 cleans exhaust gas emitted from the engine 29 with the aid of a urea SCR device 30N using the urea selective catalytic reduction (SCR) and a DPF device 30P. The urea solution supplied to the urea SCR device 30P is accumulated in the urea solution tank 32. The embodiment illustrates a case where the exhaust gas treatment system (the urea SCR device 30N and the urea solution tank 32) using the urea solution is included in the work vehicle 1, but does not exclude the work vehicle 1 without such an exhaust gas treatment system. Moreover, the configuration or kind of the exhaust gas treatment device 30 varies depending on the kind of the engine 29. Next, a control example of the engine control device 10 is described.

The engine control device 10 controls the amount of fuel supplied to the engine 29 based on the rotating speed of a crank shaft of the engine 29, the rotating speed being detected by the rotating speed detection sensor 38, the setting of a fuel adjustment dial 29S, and the like. In this manner, the engine control device 10 controls the engine 29. The engine control device 10 controls the amount of urea solution supplied to the urea SCR device 30N of the exhaust gas treatment device 30 based on, for example, the amount of nitrogen oxides contained in the exhaust gas emitted from the engine 29.

The exhaust gas treatment device 30 includes various sensors 30C. The various sensors 30C include, for example, a sensor for detecting the amount of nitrogen oxides contained in the exhaust gas, a temperature sensor for detecting the temperature of the exhaust gas, and a sensor for detecting ammonia in the urea SCR device 30N. The engine control device 10 supplies the urea solution to an unillustrated injection device from the urea solution tank 32 if the amount of nitrogen oxides contained in the exhaust gas, the amount being detected by the various sensors 30C, exceeds a predetermined amount. The injection device is included in the configuration of the urea SCR device 30N. The urea SCR device 30N then causes the injection device to inject the urea solution into the exhaust gas. As a consequence, the nitrogen oxides contained in the exhaust gas are reduced (decomposed) by the urea solution into nitrogen and water.

The engine control device 10 obtains the amount of the urea solution remaining in the urea solution tank 32 based on the detection value of the liquid level detection sensor 39A that detects the amount of the urea solution accumulated in the urea solution tank 32. The engine control device 10 transmits the obtained amount of the remaining urea solution to the monitor 20. The monitor 20 causes a screen 21D to display the amount of the remaining urea solution. Moreover, the engine control device 10 obtains the amount of fuel remaining in the fuel tank 31 based on the detection value of the liquid level detection sensor 39F that detects the amount of the fuel accumulated in the fuel tank 31. The engine control device 10 transmits the obtained amount of the remaining fuel to the monitor 20 and, for example, displays the amount of the remaining fuel on a fuel gauge displayed on the screen 21D of the monitor 20. It may be configured such that the detection value of the liquid level detection sensor 39F that detects the amount of fuel is transmitted directly to the monitor 20 and, for example, a display control unit 22 of the monitor 20 obtains the amount of the fuel remaining in the fuel tank 31. Moreover, it may be configured such that the detection value of the liquid level detection sensor 39A that detects the amount of urea solution is transmitted directly to the monitor 20 and, for example, the display control unit 22 of the monitor 20 obtains the amount of the urea solution remaining in the urea solution tank 32.

The engine control device 10 transmits a "signal indicating that the engine 29 is in operation" to the monitor 20 via the in-vehicle signal line 28. The monitor 20 clocks the amount of time the signals are received and obtains cumulative operating time. The engine control device 10 receives a signal from the rotating speed sensor 38 that detects the rotating speed of the engine 29, generates the "signal indicating that the engine 29 is in operation" based on the signal, and transmits the signal to the monitor 20. However, even if the engine control device 10 does not transmit the "signal indicating that the engine 29 is in operation." to the monitor 20 due to some cause, the cumulative operating time can be obtained as follows.

A signal (predetermined voltage) from the alternator 35 is transmitted to the monitor 20 via a signal line 35A. The monitor 20 clocks the amount of time the signals from the alternator 35 are received, and obtains the cumulative operating time. The signals of the alternator 35 may be transmitted all the time to the monitor 20 to clock the cumulative operating time without using the "signal indicating that the engine 29 is in operation" as described above. Alternatively, the signals of the rotating speed sensor 38 may be transmitted directly to the monitor 20 to clock the cumulative operating time using the signals of the rotating speed sensor 38. As described above, the monitor 20 can clock the cumulative operating time.

The fuel adjustment dial 29S, the sensors 30C, the rotating speed detection sensor 38, and the liquid level detection sensors 39A and 39F are electrically connected to the engine control device 10. Such a structure allows the engine control device 10 to acquire the set value from the fuel adjustment dial 29S via the input/output unit 13, and acquire detection values from the various sensors 30C, the rotating speed detection sensor 38, and the liquid level detection sensors 39A and 39F. Next, the monitor 20 is described.

(Monitor 20)

The monitor 20 is a device that displays images. The monitor 20 includes a display unit 21 and the display control unit 22. The monitor 20 is installed in an unillustrated cab of the work vehicle 10. In the embodiment, the monitor 20 displays, for example, various pieces of information of the work vehicle 1 as images on the display unit 21. The information of the work vehicle 1 displayed on the screen of the monitor 20 includes, for example, the temperature of the cooling water that cools the engine 29, the temperature of the hydraulic fluid discharged by the hydraulic pump 29OP, the cumulative operating time of the work vehicle 1, and various alarms and error codes, in addition to the above-mentioned amounts of remaining fuel and urea solution.

In the embodiment, the monitor 20 also functions as an input device, in addition to displaying various images on the screen 21D of the display unit 21. For this purpose, the monitor 20 includes the input device 21S below the screen 21D of the display unit 21. The input, device 21S is not limited to below the display unit 21, but may be in another location or may be a separate body from the display unit 21. If the input device 21S is a separate body from the display unit 21, the input device 21S may be provided on a console in the unillustrated cab. In the embodiment, a plurality of push button-type switches of the input device 21S is arranged below the screen 21D in the horizontal direction. The operation of the input device 21S enables, for example, images displayed on the screen 21D of the monitor 20 to be switched, the work vehicle 1 to execute a process, or various settings for the operation of the work vehicle 1 to be executed. The process that the work vehicle 1 is caused to execute is, for example, the regeneration process of the diesel particulate filter (DPF) device 30P of the exhaust gas treatment device 30, or the output restriction releasing process of the engine 29. The output restriction releasing process is the process of temporarily releasing the output restriction while the output of the engine 29 is being restricted if soot is accumulated to a predetermined level in a filter of the DPF device 30P or if the amount of the urea solution decreases to a predetermined level. The processes that the work vehicle 1 is caused to execute are not limited to them. The work vehicle 1 may restrict the discharge amount of the hydraulic fluid of the hydraulic pump 29OP and also restricts the output of the hydraulic pump 29OP in addition to the engine 29 if soot is accumulated to the predetermined level in the filter of the DPF device 30P or if the amount of the urea solution decreases to the predetermined level.

The display unit 21 of the monitor 20 is, for example, a liquid crystal display device, but not limited to this. In the embodiment, the monitor 20 also functions as an input device, but the display unit 21 may include a touch panel in the screen 21D to cause the monitor 20 to exhibit the function of the input device.

The display control unit 22 controls the operation of the display unit 21, performs image processing, and processes input from the input device 21S. The display control unit 22 includes, for example, a processing unit and a storage unit. The display control unit 22 includes the processing unit of, for example, a combination of a CPU and a memory, and the storage unit of, for example, a RAM, a ROM, a flash memory, a hard disk drive, or the like, or a combination thereof. The storage unit stores a computer program and data that are necessary for the display control unit 22 to execute the above-mentioned various processes, and various pieces of setting data on the operation of the work vehicle 1.

In the embodiment, the monitor 20 is electrically connected to the in-vehicle signal line 28. The monitor 20 communicates with the engine control device 10, a communication processing device 37T, and the like using a communication protocol applied to the in-vehicle signal line 28 such as controller area network (CAN).

(Communication Device 24)

The communication device 24 includes an antenna 24A. The communication device 24, the position detection device 25, and the in collecting device 37 are built in the communication processing device 37T. The communication processing device 37T is electrically connected to the in-vehicle signal line 28. The communication device 24 can communicate with the outside of the work vehicle 1. In the embodiment, the communication device 24 is, for example, a communication modem. The communication device 24 includes various control devices, various sensors, a communication terminal, and a communication modem. The communication device 24 performs wireless communication with the antenna 24A. The information collecting device 37 connected to the communication device 24 collects the operation information of the work vehicle 1, for example, from the sensors included in the work vehicle 1, the engine control device 10, and the monitor 20. The operation information is transmitted to the outside via the communication device 24 and the antenna 24A. Moreover, the communication device 24 receives information transmitted from an external management apparatus to the work vehicle 1.

(Position Detection Device 25)

The position detection device 25 includes a GPS antenna 25A. The GPS antenna 25A receives radio waves output from a plurality of GPS satellites constituting global positioning system (GPS). The GPS antenna 25A outputs the received radio waves to the position detection device 25. The position detection device 25 converts the radio waves received by the GPS antenna 25A into electrical signals, and calculates (determines) self-position information, that is, the position of the position detection device 25 and accordingly obtains the position information of the work vehicle 1 on which the position detection device 25 is mounted. The position information is information on the position of the work vehicle 1, and is the coordinates of latitude, longitude, and altitude. The position of the position detection device 25 itself may be measured by not limited to the GPS satellites but other positioning satellites. In other words, the position can be measured by global navigation satellite system (GNSS). The position information of the work vehicle 1 obtained by the position detection device 25, together with the operation information of the work vehicle 1, is transmitted by the communication device 24 to the outside of the work vehicle 1.

(In-Vehicle Signal Line 28)

The in-vehicle signal line 28 is, for example, controller area network (CAN). The electronic components such as the engine control device 10, the monitor 20, and the communication processing device 37T, which are connected to the in-vehicle signal line 28, can communicate with each other via the in-vehicle signal line 28. In the embodiment, in addition to these electronic components, electronic components such as a control device that controls a hydraulic system of the work vehicle 1, a control device that controls the travel device 33 of the work vehicle 1, and a device that controls the various sensors included in the work vehicle 1 are electrically connected. The electronic components electrically connected to the in-vehicle signal line 28 can communicate with each other via the in-vehicle signal line 28.

A terminal 28T is electrically connected to the in-vehicle signal line 28. A terminal device or the like is connected to the terminal 28T and accordingly the above-mentioned terminal device, the monitor 20, and the like can exchange information with each other via the terminal 28T and the in-vehicle signal line 28. One including a communication function and a storage function such as a personal computer, a mobile terminal, or a storage device and a recording device can be used as the above-mentioned terminal device. Moreover, it may be configured such that the operation information of the work vehicle 10 collected by the information collecting device 37 can be downloaded to the above-mentioned terminal device by using a wireless local area network (LAN) device as the terminal 28T. It may be configured such that the functions of the wireless LAN device are covered by the above-mentioned communication device 24 to similarly download abnormality information and the like.

As described above, the engine control device 10 is electrically connected to the monitor 20 via the in-vehicle communication line 28. Moreover, as described above, the liquid level detection sensors 39A and 39F, and the rotating speed sensor 38 are electrically connected to the engine control device 10. Such a structure enables the monitor 20 to acquire the information on the amount of remaining fuel or urea solution detected by the liquid level detection sensor 39A or 39F and receive a driving signal indicating that the engine 29 is in operation, via the engine control device 10.

The engine control device 10 acquires data indicating the amounts of remaining fuel and urea solution from the liquid level detection sensors 39A and 39F in predetermined cycles and generates information indicating the amounts of remaining fuel and urea solution. Furthermore, the engine control device 10 transmits the information indicating the amounts of remaining fuel and urea solution in predetermined cycles to the monitor 20 via the in-vehicle signal line 28.

(Travel Device 33)

The travel device 33 causes the work vehicle 1 to travel by the power generated by the engine 29. In the embodiment, the travel device 33 includes a hydraulic motor 33M and a crawler 33O. The hydraulic motor 33M rotates with the hydraulic fluid supplied from the hydraulic pump 29OP driven by the engine 29. The hydraulic pump 29OP is controlled over the discharge amount of hydraulic fluid by an unillustrated pump control device. The hydraulic motor 33M rotates the crawler 33C and accordingly the travel device 33 causes the work vehicle 10 to travel. The travel device 33 is not limited to the one including the crawler 33C and the like. For example, the travel device 33 may be a device chat transfers the power of the engine 29 to wheels via a torque converter and a transmission device.

(Storage Battery 34 and Alternator 35)

The work vehicle 1 includes the storage battery 34. The storage battery 34 is a secondary battery such as a lead-acid battery or a nickel-hydrogen battery. The storage battery 34 supplies electric power to a starter motor for starting the engine 29, and supplies electric power to various electronic components of the work vehicle 1 including the monitor 20. The storage battery 34 is charged with electricity generated by the alternator 35. The alternator 35 generates power by being driven in cooperation with the drive of the engine 29. The electricity generated by the alternator 35 is charged in the storage battery 34.

As described above, the monitor 20 receives the signal from the alternator 35 and accordingly can determine whether or not the alternator 35 is Operating normally. Moreover, as described above, the monitor 20 clocks the amount of time the signals from the alternator 35 are received and accordingly can also obtain the cumulative operating time of the work vehicle 1.

(Key Switch 36)

The power supplied from the storage battery 34 is supplied via the key switch 36 to the electronic components such as an unillustrated starter, the engine control device 10, the monitor 20, and the communication processing device 37T. The key switch 36 is electrically connected to the storage battery 34. Furthermore, the key switch 36 is electrically connected to the engine control device 10, the monitor 20, and the communication processing device 37T. One using a cylinder lock, one of a push-button type, an immobilizer key using wireless communication, or the like can be used as the key switch 36. If the key switch 36 is turned on, then power is supplied from the storage battery 34 to the engine control device 30, the monitor 20, and the communication processing device 37T. If the key switch 36 is turned off, then the power to be supplied from the storage battery 34 to the engine control device 10, the monitor 20, and the communication processing device 37T is interrupted.

<Regarding Releasing of Output Restriction>

If the engine control device 10 is restricting the output of the engine 29 and/or the like, the output restriction can temporarily be released depending on the condition after a constraint on the number of times or amount of time of the releasing of the output restriction is prescribed. In the embodiment, if the engine control device 10 is restricting the output of the engine 29 and/or the like, and the output restriction can temporarily be released, the monitor 20 displays information to that effect on the screen 21D. Consequently, the operator of the work vehicle can grasp whether or not the above-mentioned output restriction can be released when the output of the engine 29 and/or the like is restricted. Accordingly, convenience is improved. Next, a description is given of the process of displaying information that the output restriction, can temporarily be released in association with images to be displayed on the screen 21D of the monitor 20.

Figure 2:
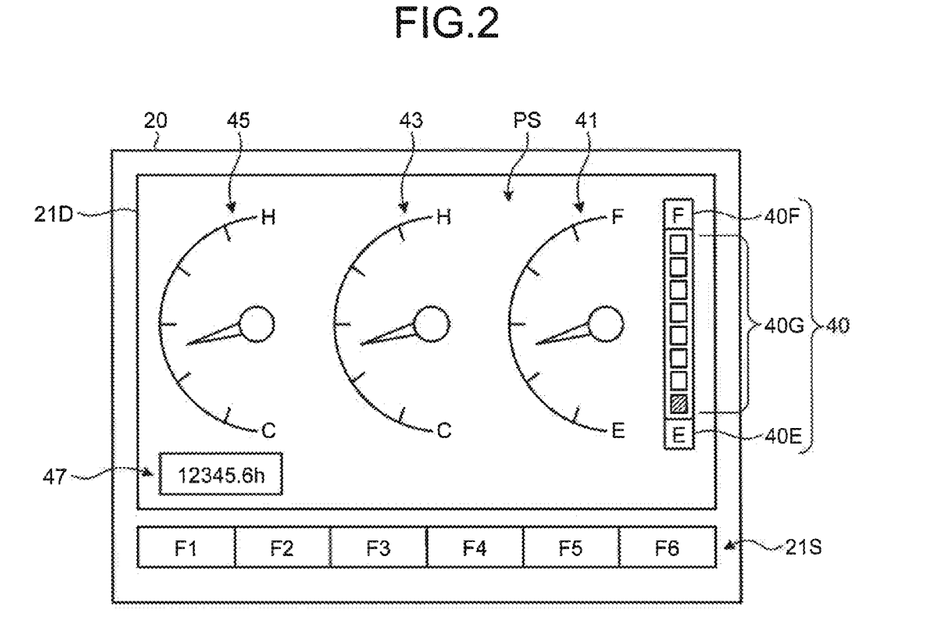
FIG. 2 is a diagram illustrating an example of an image normally displayed on a monitor during the operation of the work vehicle.

FIG. 2 is a diagram illustrating an example of an image normally displayed on the monitor 20 during the operation of the work vehicle 1. The image normally displayed is a screen including at least a cooling water temperature gauge 45, a fuel gauge 41, and a urea solution gauge 40. For example, the monitor 20 displays, on the screen 21D, an image PS illustrated in FIG. 2 as the image normally displayed. The image PS is hereinafter referred to as the operating state display image PS in some cases. For example, after the key switch 36 of the work vehicle 1 illustrated in FIG. 1 is turned on and the engine 29 is started, the operating state display image PS is displayed on the screen 21D of the monitor 20. After displaying the operating state display image PS on the screen 21D, the monitor 20 displays the operating state display image PS on the screen 21D unless input into the monitor 20 occurs or some event occurs on the work vehicle 1.

The above-mentioned input into the monitor 20 is, for example, input to the effect that the image displayed on the screen 21D is switched. Events necessary to switch the display on the screen 21D of the operating state display image PS include, for example, an event where some abnormality occurs on the exhaust gas treatment device 30 and it is necessary to prompt the operator of the work vehicle 1 to perform the process of resolving the abnormality. The conditions necessary to switch the display on the screen 21D of the operating state display image PS are not limited to them.

The operating state display image PS includes, for example, the fuel gauge 41 indicating the amount of remaining fuel, a hydraulic fluid temperature gauge 43 indicating the temperature of the hydraulic fluid, the cooling water temperature gauge 45 indicating the temperature of the cooling water of the engine 29, and cumulative operating time 47 indicating the cumulative operating time of the engine 29. In the embodiment, the urea solution gauge 40 is also included in the operating state display image PS. The amount of remaining urea solution indicated by the urea solution gauge 40 is information on the state of the exhaust gas treatment device 30. The operating state display image PS illustrated in FIG. 2 is an example. The hydraulic fluid temperature gauge 43 indicating the temperature of the hydraulic fluid may not be displayed on the operating state display image PS.

If there is a large amount of fuel remaining in the fuel tank 31, a needle shown on the fuel gauge 41 points a direction close to F. If there is a small amount of fuel remaining in the fuel tank 31, the needle shown on the fuel gauge 41 points a direction close to E. If needles shown on the hydraulic fluid temperature gauge 43 and the cooling water temperature gauge 45 point a direction close to H, it indicates that the temperatures of the hydraulic fluid and the cooling water are high. If the needles shown on the hydraulic fluid temperature gauge 43 and the cooling water temperature gauge 45 point a direction close to C, it indicates that the temperatures of the hydraulic fluid and the cooling water are low.

The cumulative operating time 47 represents the cumulative value of the amount of time the engine 29 of the work vehicle 1 has operated thus far as the cumulative operating time of the work vehicle 1. The cumulative operating time is obtained based on the signals transmitted from the engine control device 10 to the monitor 20 as described above. The operating state display image PS displays at least the cumulative operating time as the information of the work vehicle 1. In the example illustrated in FIG. 2, the cumulative operating time is 12345.6 h (hours). The operating state display image PS displayed during the operation of the work vehicle 1 and accordingly may include information necessary during the operation of the work vehicle 1 in addition to the cumulative operating time. Such information includes, for example, type information on various mode settings such as an operating mode that places a high priority on the fuel consumption of the work machine 1, or an operating mode that places a high priority on the digging force of the work vehicle 1, or type information on the mode setting of the travel speed of the work machine 1. If the work machine 1 is one that frequently travels such as a dump truck or a wheel loader, the cumulative travel distance, travel speed, or the like also becomes necessary information during the operation of the work vehicle 1.

A plurality of indicators 40G indicating the position of the surface of the urea solution accumulated in the urea solution tank 32 is displayed on the urea solution gauge 40 between a state F where the urea solution tank 32 is filled with the urea solution and a state E where the urea solution tank 32 is empty of the area solution. The state F of being full of the urea solution is represented by an icon 40F. The state E of being empty of the urea solution is represented by an icon 40E. It is preferred that the urea solution gauge 40 be displayed at a position next to the fuel gauge 41. The urea solution or fuel is managed from the common viewpoint that they are consumed and are necessary to be successively refilled. Therefore, the management of the remaining amounts becomes easy by displaying the urea solution gauge 40 and the fuel gauge 41 at close positions.

The plurality of indicators 40G lights up in accordance with the amount of urea solution remaining in the urea solution tank 32, that is, the position of the surface of the urea solution. If the position of the surface of the urea solution is close to the top of the urea solution tank 32, the indicators 40G on the icon 40F side light up. FIG. 2 illustrates a state where the hatched indicator 40G is lighting (the same applies in the following). If the urea solution is consumed and the position of the surface of the urea solution approaches the bottom of the urea solution tank 32, the indicators 40G on the icon 40F side are sequentially turned off according to the reduced amount of urea solution. Such an operation causes the urea solution gauge 40 to display the remaining amount of the urea solution accumulated in the urea solution tank 32. In other words, the urea solution gauge 40 dish lays the amount of remaining urea solution depending on the number of the lighted indicators 40G. Specifically, the smaller the number of the lighted indicators 40G, the smaller the amount of remaining urea solution.

The operating state display image PS includes the urea solution gauge 40. Accordingly, the operator of the work vehicle 1 can always check the amount of remaining urea solution during work. Hence, the operator can arrange for or refill a urea solution appropriately according to the amount of remaining urea solution.

Figure 3:
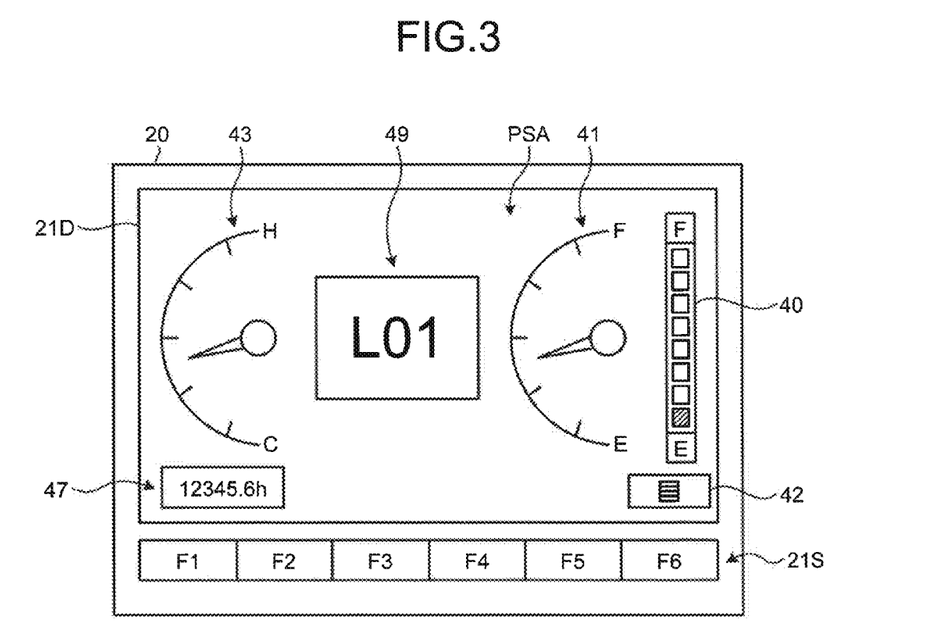
FIG. 3 is a diagram illustrating an example of an operating state display image of when some abnormality occurs on the work vehicle.

FIG. 3 is a diagram illustrating an example of an operating state display image PSA of when some abnormality occurs on the work vehicle 1. If some abnormality occurs on the work vehicle 1, the display control unit 22 illustrated in FIG. 1 displays, on the screen 21D, information for indicating the occurrence of the abnormality. In the example illustrated in FIG. 3, an error code 49 is displayed on the screen 21D. The error code 49 is displayed in the center of the screen 21D. Consequently, it becomes easy for the operator of the work vehicle 1 to perceive the error code 49, which facilitates the recognition of the occurrence of the abnormality.

As illustrated in FIG. 2, the hydraulic fluid temperature gauge 43 is displayed in the center of the screen 21D on the operating state display image PS before the occurrence of the abnormality. Once the abnormality occurs, the display control unit 22 dismisses the hydraulic fluid temperature gauge 43 and displays the error code 49. Moreover, the display control unit 22 displays an icon 42 to switch the operating state display image PSA displayed on the screen 21D to another image, for example, a menu image on which various setting information, repair history information, or the like is displayed. The icon 42 is displayed directly above a switch F6 of the input device 21S. The operator of the work vehicle 1 can switch the operating state display image PSA displayed on the screen 21D to another image by pressing the switch F6 corresponding to the icon 42.

Figure 4:
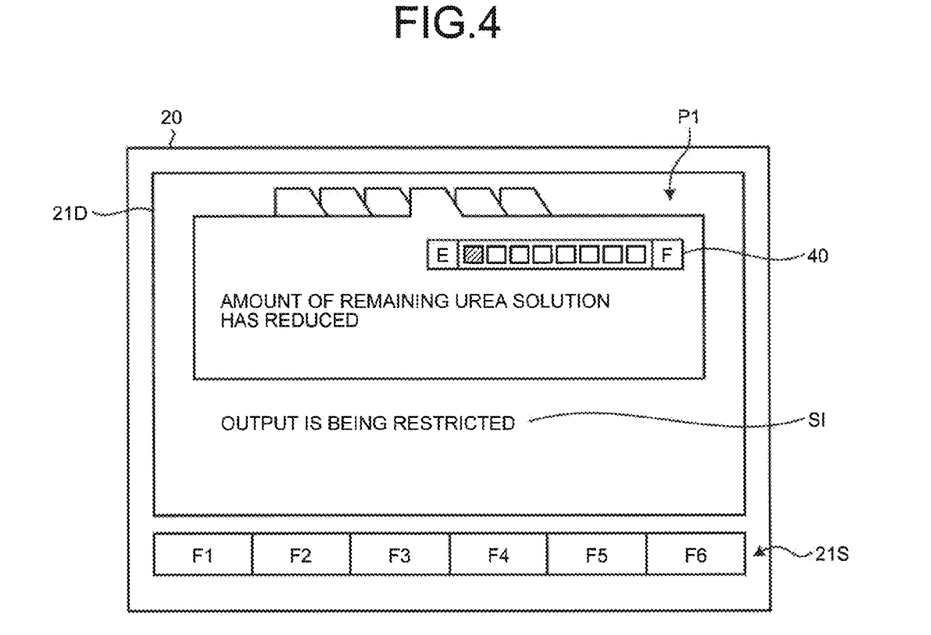
FIG. 4 is a diagram illustrating an example of a first image.

FIG. 4 is a diagram illustrating an example of a first image P1. If the switch F6 illustrated in FIG. 3 is pressed, the switch F6 corresponding to the icon 42 of the operating state display image PSA after the occurrence of the abnormality, the display control unit 22 illustrated in FIG. 1 switches the display of the screen 21D from the operating state display image PSA to the first image P1 illustrated in FIG. 4. It may be configured such that the screen is automatically transitioned from the operating state display image PSA to the first image P1 without pressing the switch F6 after the occurrence of the abnormality. The first image P1 represents the content of the abnormality that has occurred on the work vehicle 1. This example illustrates a case where the abnormality has occurred on the exhaust gas treatment device 30 illustrated in FIG. 1. Specifically, the content of the abnormality that has occurred on the work vehicle 1 is a reduction in the amount of remaining urea solution to be supplied to the urea SCR device 30N included in the exhaust gas treatment device 30.

The urea solution gauge 40 illustrated in FIG. 4 displays the remaining amount of the urea solution accumulated in the urea solution tank 32. The urea solution may be poorly distributed and difficult to obtain depending on the country or area. Therefore, the operator needs to always monitor the amount of remaining urea solution consumed with the operation of the work vehicle 1. In the embodiment, if the amount of remaining urea solution becomes small, a message to the effect that the "amount of remaining urea solution has reduced" illustrated in FIG. 4, together with the urea solution gauge 40, is displayed on the first image P1. Hence, it becomes easy for the operator to grasp the amount of remaining urea solution.

The example illustrated in FIG. 4 illustrates that since the amount of remaining urea solution has become small, the engine control device 10 illustrated in FIG. 1 is restricting the output of the engine 29 and/or the like. Specifically, state information SI to the effect that the output of the engine 29 and/or the like is being restricted is being displayed on the screen 21D below the information indicating that the amount of remaining urea solution has reduced. The state information SI is information that the output restriction unit is restricting the output (output restriction information). The state information SI may be displayed not by characters but by designs. Alternatively, the form of the state information SI in which an LED lamp or the like is lit up or blinked to indicate that the output is being restricted may be used.

If the engine control device 10 restricts the output of the engine 29 and/or the like, the engine control device 10 decreases an output limiting value gradually or in stages with the passage of time. Eventually, it enters a state where the output of the engine 29 and/or the like cannot be restricted any more, that is, a low idle state.

In the embodiment, the urea solution gauge 40 displayed on the operating state display images PS and PSA is displayed on the first image P1 in a state where only the landscape and portrait orientation has been changed. In other words, the urea solution gauge 40 has a similar design to the design displayed on the operating state display images PS and PSA, and the icons 40E and 40F and the indicators 40G are displayed on the first image P1. In this manner, the display control unit 22 displays device information (the amount of remaining urea solution in this example) in a similar display form on the operating state display images PS and PSA, and the first image P1. Accordingly, it becomes easy for the operator of the work vehicle 1 to grasp the amount of remaining urea solution. As a consequence, even if the image displayed on the screen 21D of the monitor 20 is transitioned between the operating state display images PS and PSA and the first image P1, the operator can grasp the amount of remaining urea solution without fail. As a consequence, the operator can refill or arrange for a urea solution at appropriate timing.

Figure 5:
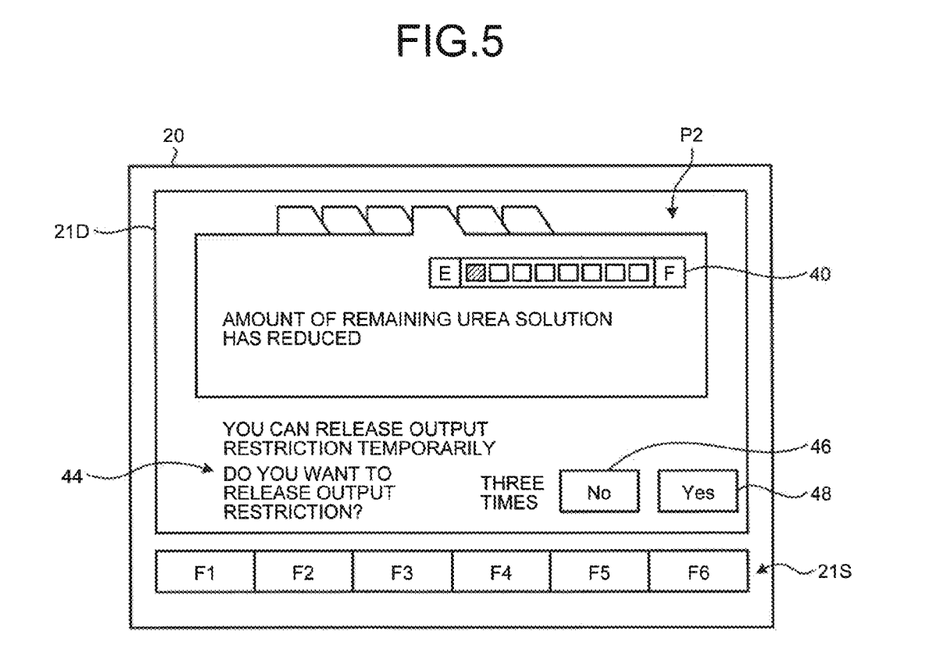
FIG. 5 is a diagram illustrating an example of a second image.

FIG. 5 is a diagram illustrating an example of a second image P2. The display control unit 22 illustrated in FIG. 1 causes the screen 21D of the monitor 20 to display the second image P2 illustrated in FIG. 5 after the passage of a predetermined time since the first image P1 was displayed. The reason why the second image P2 is not displayed on the screen 21D immediately after the first image P1 was displayed is to prevent the operator of the work vehicle 1 from overlooking the information displayed on the first image P1. The second image P2 includes information 44 that the restriction on the output of the engine 29 and/or the like can temporarily be released (hereinafter referred to as the releasing information in some cases). In other words, the display control unit 22 causes the screen 21D of the monitor 20 to display the releasing information 44. The releasing information 44 includes the message indicating that the output restriction can temporarily be released. Moreover, the releasing information 44 includes the number of times the output restriction can temporarily be released.

For example, the exhaust gas emitted from the engine 29 may be cleaned insufficiently in a state where no refill is provided as a consequence that the remaining amount of urea solution to be supplied to the urea SCR device 30N becomes small. Hence, the output of the engine 29 and/or the like is restricted to temporarily reduce the usability of the work vehicle 1 until the refill of the urea solution is complete. Accordingly, the refill of the urea solution is prompted. Moreover, also if some abnormality occurs on the work vehicle 1, in other words, an abnormality occurs on the exhaust gas treatment device 30 or the like, the output of the engine 29 and/or the like is restricted based on at least one of the kind or level of the abnormality. Also in this case, the usability of the work vehicle 1 is temporarily reduced until a measure against the abnormality is taken so as not to leave the abnormality unresolved. Accordingly, recovery from the abnormality is prompted.

If the output of the engine 29 and/or the like is restricted, for example, inconvenience that the work vehicle 1 cannot go up the slope to the top and stops halfway may occur. In such a case, a hindrance may be given to the passage of other work vehicles 1 and vehicles, or the work vehicle 1 itself may be located at an unstable place. Accordingly, the engine control device 10 temporarily releases the output restriction at the request of the operator of the work vehicle 1. The releasing of the output restriction enables, for example, the work vehicle 1 that has stopped in the middle of the slope to move to a turnout. Suppose the work machine 1 is an excavator. When the output of the engine 29 and/or the like is restricted, the output restriction is temporarily released and accordingly the swing position of the upper structure or the posture of the work equipment included in the upper structure can be changed. In this manner, the engine control device 10 temporarily releases the restriction on the output of the engine 29 and/or the like and accordingly inconvenience occurring due to the output restriction can be reduced.

If the temporary releasing of the restriction on the output of the engine 29 and/or the like is permitted without limitation, a urea solution refill may not be provided or a measure against the abnormality may not be taken. As a consequence, the exhaust gas may be cleaned insufficiently or the abnormality may not be resolved. Hence, the allowable number of times and amount of time for the temporary releasing of the output restriction are limited.

In this manner, the engine control device 10 restricts the output of the engine 29 and/or the like if an abnormality occurs on the exhaust gas treatment device 30, such as the insufficient amount of remaining urea solution, an abnormality of the urea SCR device 30N, or clogging of the filter included in the DPF device 30P, or if some abnormality occurs on the work vehicle 1. The engine control device 10 then makes it possible to temporarily release the restriction on the output of the engine 29 and/or the like as necessary. Consequently, it is possible to prompt the operator or the like to handle an abnormality that has occurred on the exhaust gas treatment device 30 or the like and to reduce inconvenience occurring on the work vehicle 1 by restricting the output of the engine 29 and/or the like. Furthermore, the engine control device 10 restricts at least one of the allowable amount of time and number of times for the temporary releasing of the output restriction and accordingly can securely handle an abnormality that has occurred on the exhaust gas treatment device 30 or the like.

In the embodiment, the allowable number of times and amount of time for the temporary releasing of the output restriction are predetermined. For example, the allowable number of times for the temporary releasing of the output restriction is three times. The allowable amount of time per release is, for example, 30 minutes. As illustrated in FIG. 5, in the embodiment, the allowable number of times for the temporary releasing of the output restriction (three times in this example) is displayed on the second image P2. With the display, the operator of the work vehicle 1 can grasp the allowable number of times for the temporary releasing of the output restriction. It is preferred in the embodiment that the long-time releasing of the output restriction can be avoided by restricting the allowable number of times for the temporary releasing of the output restriction and the allowable amount of time per release.

Only the allowable amount of time for the temporary releasing of the output restriction may be limited without limiting the allowable number of times for the temporary releasing of the output restriction. For example, instead of the releasing information 44 illustrated in FIG. 5, the allowable amount of time for the temporary releasing of the output restriction may be displayed as the releasing information 44 on the screen 21D. In this case, for example, the counting unit 11D of the engine control device 10 illustrated in FIG. 1 counts and accumulates the amount of time the output restriction is temporarily released. Whenever the output restriction is temporarily released, the released time is accumulated. Whenever the second image P1, is displayed, the cumulative time is displayed as the releasing information on the screen 21D. If the time accumulated by the counting unit 11D reaches the upper limit of the allowable amount of time for the temporary releasing of the output restriction, the processing unit 11 of the engine control device 10 illustrated in FIG. 1 may not permit the temporary releasing of the output restriction from that time onward.

The releasing information 44 is displayed on the screen 21D. Accordingly, even an operator who does not know that the restriction on the output of the engine 29 and/or the like can temporarily be released can know that the output restriction can temporarily be released and, if necessary, release the restriction on the output of the engine 29 and/or the like. Hence, for example, also if the work vehicle 1 stops on the road due to the restriction on the output of the engine 29 and/or the like, the output restriction can temporarily be released to move the work vehicle 1. Moreover, the operator can grasp the number of times or amount of time, which is the condition to temporarily release the restriction on the output of the engine 29 and/or the like, from the screen 21D of the monitor 20, and accordingly can operate the work machine 1 while controlling the releasing of the output restriction. As a consequence, the possibility of avoiding the situation to give a hindrance to the passage of other work vehicles 1 and vehicles is increased.

As illustrated in FIG. 5, an icon 46 indicating input of when the output restriction is not temporarily released and an icon 48 indicating input of when the output restriction is temporarily released are respectively displayed directly above a switch F5 and the switch F6 of the input device 21S on the second image P2. In other words, the icons 46 and 48 are respectively displayed at positions corresponding to the arranged positions of the switches F5 and F6. The urea solution gauge 40 and the message that the amount of remaining urea solution has reduced are displayed also on the second image P2. If the operator of the work vehicle 1 presses the switch F5 while the second image P2 is being displayed, the display control unit 22 illustrated in FIG. 1 transitions and switches the screen 21D of the monitor 20 to the operating state display image PSA illustrated in FIG. 3. In this case, the engine control device 10 illustrated in FIG. 1 maintains the state where the output of the engine 29 and/or the like is restricted.

Figure 6:
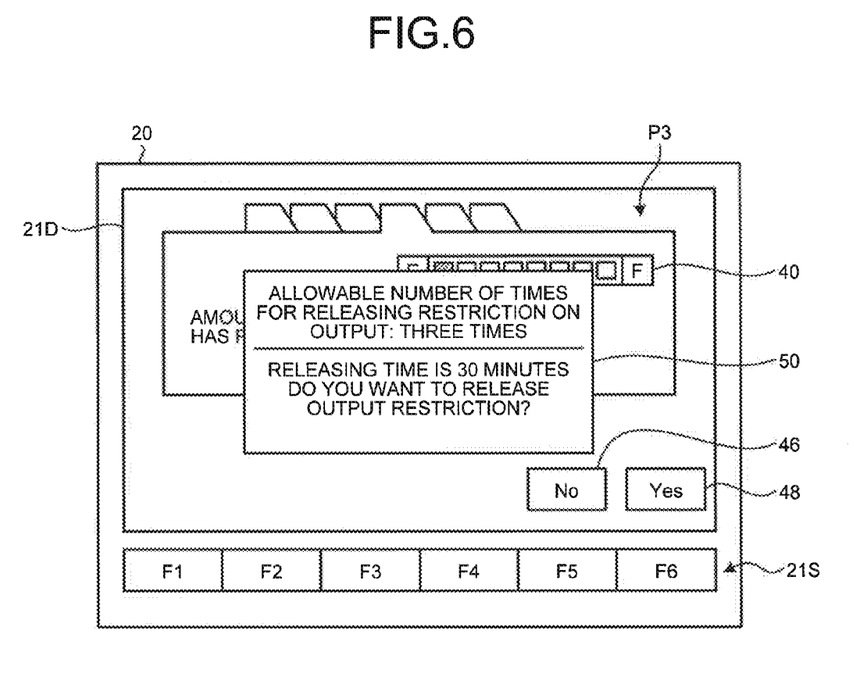
FIG. 6 is a diagram illustrating an example of a third image.

FIG. 6 is a diagram illustrating an example of a third image P3. If the operator of the work vehicle 1 presses the switch F6 while the second image P2 is being displayed, the display control unit 22 illustrated in FIG. 1 switches the screen 21D of the monitor 20 to the third image P3 illustrated in FIG. 6. Check information 50 is displayed on the third image P3, the check information 50 including at least one of information on the allowable amount of time for the releasing of the restriction on the output of the engine 29 and/or the like, information on the allowable number of times for the releasing of the output restriction, and information for determining whether or not the output restriction is released. The icon 46 indicating the input of when the output restriction is not temporarily released and the icon 48 indicating the input, of when the output restriction is temporarily released are respectively displayed directly above the switch F5 and the switch F6 of the input device 21S also on the third image P3. The embodiment illustrates the case where the third image P3 is displayed on the screen 21D. However, it may be configured such that the third image P3 is not displayed after the switch F6 corresponding to the icon 48 indicating the input of when the output restriction is temporarily released is operated on the second image P2, and the output restriction is temporarily released.

If the operator of the work vehicle 1 presses the switch F5 while the third image P3 is being displayed, the display control unit 22 illustrated in FIG. 1 transitions and switches the screen 21D of the monitor 20 to the second image P2 illustrated in FIG. 5. It may be configured such that if the operator of the work vehicle 1 presses the switch F5 while the third image P3 is being displayed, the screen 21D is transitioned and switched to the first image P1. As described above, if the state where the third screen P3 is being displayed transitions to the second image P2 or the first image P1, the engine control device 10 illustrated in FIG. 1 maintains the state where the output of the engine 29 and/or the like is being restricted.

Figure 7:
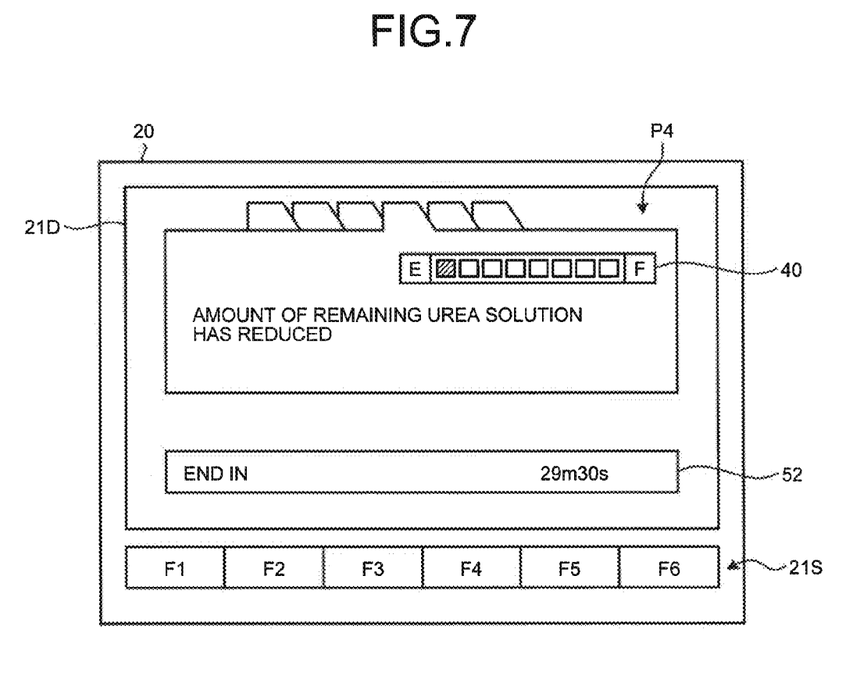
FIG. 7 is a diagram illustrating an example of a fourth image.

FIG. 7 is a diagram illustrating an example of a fourth image P4. If the operator of the work vehicle 1 presses the switch F6 while the third image P3 is being displayed, the display control unit 22 illustrated in FIG. 1 switches the screen 21D of the monitor 20 to the fourth image P4 illustrated in FIG. 7. In this case, the releasing unit 11C of the engine control device 10 illustrated in FIG. 1 releases the restriction on the output of the engine 29 and/or the like. The fourth image P4 includes information 52 indicating the remaining time until the end of the releasing of the restriction on the output of the engine 29 and/or the like (the remaining time information). The urea solution gauge 40 and the message that the amount of remaining urea solution has reduced are displayed also on the fourth image P4. The remaining time information 52 may be displayed, for example, in a form of displaying the remaining time by a graphic such as an indicator. The remaining time information 52 may be displayed, for example, after the length of the indicator is changed with reducing remaining time until the end of the releasing of the restriction on the output of the engine 29 and/or the like. The operator of the work vehicle 1 can grasp the allowable amount of time for the releasing of the output restriction by visually checking the above-mentioned remaining time. It may be configured such that if the operator of the work vehicle 1 presses the switch F6 while the third image P3 is being displayed, the display control unit 22 illustrated in FIG. 1 switches the screen 21D of the monitor 20 to a different image from the fourth image P4 illustrated in FIG. 7.

The above-mentioned remaining time is counted by the counting unit 11D of the engine control device 10 illustrated in FIG. 1. If the above-mentioned remaining time becomes zero, the releasing unit 11C ends the releasing of the restriction on the output of the engine 29 and/or the like. In this manner, the releasing unit 11C has the function of temporarily releasing the restriction on the output of the engine 29 and/or the like. If the releasing of the restriction on the output of the engine 29 and/or the like ends, the display control unit 22 illustrated in FIG. 1 switches the screen 21D of the monitor 20 to the first image P1 illustrated in FIG. 4. Next, a description is given, using a flowchart, of a process performed when the restriction on the output of the engine 29 and/or the like is temporarily released if abnormalities including a reduction in the remaining amount of the urea solution accumulated in the urea solution tank 32 have occurred, in other words, if some abnormality has occurred on the work vehicle 1.

<Example of Process of Releasing Output Restriction>

Figure 8:
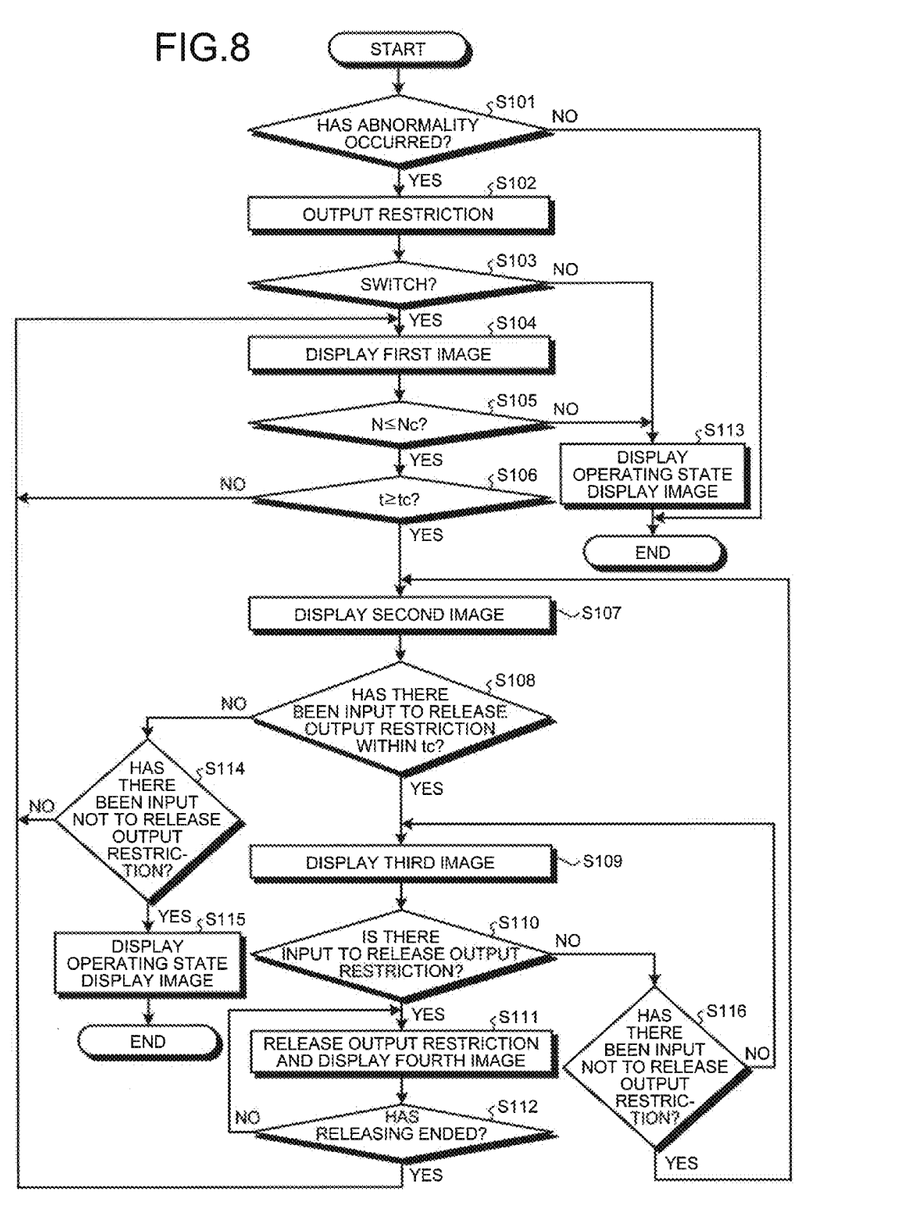

FIG. 8 is a flowchart illustrating an example of the process of releasing the restriction on the output of the engine 29 and/or the like. The operating state display image PS illustrated in FIG. 2 is being displayed on the screen 21D of the monitor 20 illustrated in FIG. 1, if some abnormality occurs on the work vehicle 1 (Step S101, Yes), the engine control device 10 restricts the output of the engine 29 and/or the like in Step S102. The display control unit 22 illustrated in FIG. 1 switches the display of the screen 21D of the monitor 20, for example, to the operating state display image PSA including the error code 49 illustrated in FIG. 3. If an abnormality does not occur on the work vehicle 1 (Step S101, No), the process ends.

If there is input to switch the operating state display image PSA to the first image P1 in Step S103 (Step S103, Yes), the display control unit 22 displays the first image P1 illustrated in FIG. 4 on the screen 21D in Step S104. Next, in Step S105, the display control unit 22 compares the number of times the restriction on the output of the engine 29 and/or the like has been released (hereinafter referred to as the number of times of releasing in some cases) N with a limiting value Nc and, if the number of times of releasing N is equal to or less than the limiting value No (N≤Nc, Step S105, yes), proceeds to Step S106. The number of times of releasing N is obtained, for example, by the releasing unit 11C of the engine control device 10. The display control unit 22 acquires the current number of times of releasing N from the engine control device 10 via the in-vehicle signal line 28. The limiting value Nc is three in the embodiment.

In Step S106, the display control unit 22 compares the time t that has passed since the first image P1 was displayed on the screen 210 (hereinafter referred to as the elapsed time in some cases) with predetermined standby time tc. As a consequence, if the elapsed time t is shorter than the standby time to (Step S106, No), the display control unit 22 repeats Steps S104 to S106. If the elapsed time t is equal to or more than the standby time to (t≥tc, Step S106, Yes), the display control unit 22 proceeds to Step S107. In Step S107, the display control unit 22 displays the second image 22 illustrated in FIG. 5 on the screen 21D.

In this manner, in the embodiment, the first image P1 is displayed on the screen 21D until the standby time to passes after the display of the screen 21D of the monitor 20 is switched from the operating state display image PSA to the first image P1. The second image 22 is displayed on the screen 21D after the passage of the standby time tc. The standby time tc is not limited, but can be set to be, for example, approximately 10 to 20 seconds. The reason why the first image 21 is displayed on the screen 21D until the standby time tc passes is, as described above, to cause the operator to recognize that the output of the engine 29 and/or the like is being restricted.

If the second image P2 is displayed on the screen 21D, the display control unit 22 determines in Step S108 whether or not there has been the input to release the output restriction within the standby time to after the second image P2 was displayed on the screen 21D. The standby time to in Step S108 is the same as the standby time to in Step S106. In Step S108, the input to release the output restriction occurs by the switch F6 being pressed while the second image P2 illustrated in FIG. 5 is being displayed on the screen 21D.

If the operator presses the switch F6 while the second image P2 is being displayed on the screen 21D of the monitor 20 and within the standby time tc, the input to release the output restriction occurs. If there is the input to release the output restriction within the standby time tc (Step S108, Yes), the display control unit 22 displays the third image P3 illustrated in FIG. 6 on the screen 21D in Step S109. In Step S110, if there is the input to release the output restriction while the third image P3 is being displayed on the screen 21D (Step S110, Yes), execution proceeds to Step S111. In Step S110, the input to release the output restriction occurs hr the switch F6 being pressed while the third image P3 illustrated in FIG. 6 is being displayed on the screen 21D.

In Step S111, the releasing unit 11C of the engine control device 10 illustrated in FIG. 1 releases the restriction on the output of the engine 29 and/or the like. If the restriction on the output of the engine 29 and/or the like has been released, the counting unit 11D of the engine control device 10 counts time from the releasing of the output restriction. The display control unit 22 displays the fourth image 24 illustrated in FIG. 7 on the screen 21D of the monitor 20. As described above, the remaining time information 52 until the end of the releasing of the restriction on the output of the engine 29 and/or the like is displayed on the fourth image 24.

Next, proceeding to Step S112, the display control unit 22 determines whether or not the releasing of the restriction on the output of the engine 29 and/or the like has ended. Whether or not the releasing of the output restriction has been ended is determined based on whether or not time from the releasing of the output restriction, which was counted by the counting unit 11D of the engine control device 10, reaches the predetermined time (30 minutes in the embodiment). Moreover, it may be configured such that the releasing of the output restriction can be ended by the operation of the operator. In this case, the display control unit 22 determines that the releasing of the output restriction has ended, for example, when receiving a signal to end the releasing of the output restriction, the signal having been generated by the operator operating the input device 21S.

If the releasing of the restriction on the output of the engine 29 and/or the like does not end (Step S112, No), the control unit 22 and the engine control device 10 repeats Steps S111 and S112. If the releasing of the restriction on the output of the engine 29 and/or the like has ended (Step S112, Yes), the display control unit 22 returns to Step S104, and displays the first image P1 illustrated in FIG. 4 on the screen 21D of the monitor 20. The releasing unit 11C of the engine control device 10 ends the releasing of the restriction on the output of the engine 29 and/or the like. The output restriction unit 11B then resumes the restriction on the output of the engine 29 and/or the like.

Next, a description is given returning to Step S103. If there is no input to switch the operating state display image PSA to the first image P1 in Step S103 (Step S103, No), the display control unit 22 causes the screen 21D of the monitor 20 to display the operating state display image PSA illustrated in FIG. 3 in Step S113. Next, a description is given returning to Step S105. If the number of times of releasing N is greater than the limiting value Nc in Step S105 (N>Nc, Step S105, No), the restriction on the output of the engine 29 and/or the like would be released exceeding the allowable number of times for the releasing of the output restriction. In this case, the output restriction cannot be released.

If the number of times of releasing N is greater than the limiting value Nc, the output restriction unit 11B of the engine control device 10 continues the restriction on the output of the engine 29 and/or the like. The display control unit 22 causes the screen 21D of the monitor 20 to display the operating state display image PSA illustrated in FIG. 3 in Step S113. In other words, if the restriction on the output of the engine 29 and/or the like cannot temporarily be released, the information that the output restriction can temporarily be released (the releasing information 44) is not displayed. Consequently, it is possible to avoid a situation where the operator falsely recognizes that the restriction on the output of the engine 29 and/or the like can temporarily be released when the output restriction cannot temporarily be released. In the embodiment, the releasing information 44 is included in the second image P2 illustrated in FIG. 5. Accordingly, if the number of times of releasing N is greater than the limiting value Nc, the display control unit 22 does not display the second image 92 but displays the operating state display image PSA on the screen 21D.

Next, a description is given returning to Step S108. If there has been no input to release the output restriction within the standby time to (Step S108, No), execution proceeds to Step S114. In Step S114, the display control unit 22 determines whether or not there has been the input intended not to release the output restriction (hereinafter referred to as the output restriction continuation, permission input). In Step S108, the output restriction continuation permission input occurs by the switch F5 being pressed while the second image P2 illustrated in FIG. 5 is being displayed on the screen 21D.

If there has been the output restriction continuation permission input (Step S114, Yes), the display control unit 22 causes the screen 21D of the monitor 20 to display the operating state display image PSA illustrated in FIG. 3 in Step S115.

If there has not been the output restriction continuation permission input (Step S114, No), the display control unit 22 returns to Step S104 and executes the subsequent processes. In other words, if there has not been the output restriction continuation permission input, the display control unit 22 displays the first image P1 on the screen 21D of the monitor 20 and displays the second image P2 on the screen 21D in Step S107 after the passage of the standby time tc. As a consequence, the first image P1 and the second image P2 are alternately displayed on the screen 21D of the monitor 20 at predetermined time intervals (in every standby time tc in the embodiment) until there is either the input to release the output restriction or the output restriction continuation permission input while the second image P2 is being displayed. Consequently, the monitor 20 can prompt the operator of the work vehicle 1 for the input to either release or not release the output restriction.

Next, a description is given returning to Step S110. In Step S110, if there is no input to release the output restriction while the third image 23 is being displayed on the screen 21D (Step S110, No), execution proceeds to Step S116. In Step S116, the display control unit 22 determines whether or not there has been the input not to release the output restriction, that is, the output restriction continuation permission input. In Step S116, the output restriction continuation permission input occurs by the switch F5 being pressed while the third image P3 illustrated in FIG. 6 is being displayed on the screen 21D.

If there has been the output restriction continuation permission input (Step S116, Yes), the display control unit 22 returns to Step S107 and executes the subsequent processes. If there has not been the input not to release the output restriction (Step S116, No), the display control unit 22 repeats Steps S109 and S110. In this manner, the process of releasing or continuing the restriction on the output of the engine 29 and/or the like is executed in the work vehicle 1.

The embodiment has been described above. However, the embodiment is not limited by the above-mentioned content. Moreover, the above-mentioned components include components that can be easily assumed by those skilled in the art, and substantially the same components, what is called components within the range of equivalents. Furthermore, the above-mentioned components can be combined as appropriate. Furthermore, at least one of various omission, replacements, and changes of the components can be made within the range that does not depart from the gist of the embodiment.

REFERENCE SIGNS LIST

1 Work vehicle
10 Engine control device
11 Processing unit
11A Detection unit
11B Output restriction unit.
11C Releasing unit
11D Counting unit
12 Storage unit
13 Input/output unit 20 Monitor
21 Display unit
21D Screen
22 Display control unit
28 In-vehicle signal line
29 Engine
29OP Hydraulic pump
29S Fuel adjustment dial
30 Exhaust gas treatment device
30N Urea SCR device
30P DPF device
35 Alternator
35 Voltage sensor
36 Key switch
38 Rotating speed detection sensor
40 Urea solution gauge
40G Indicator
41 Fuel gauge
43 Hydraulic fluid temperature gauge
44 Releasing information
45 Cooling water temperature gauge
47 Cumulative operating time
P1 First image
P2 Second image
P3 Third image
P4 Fourth image
PS, PSA Operating state display image

The invention claimed is:

1. A work vehicle including an internal combustion engine that generates power and an exhaust gas treatment device that treats exhaust gas emitted from the internal combustion engine, the work vehicle comprising:
    a detector that detects an abnormality of the exhaust gas treatment device;
    a processor programmed to restrict output of an output generation device including the engine of the work vehicle when the detector detects the abnormality of the exhaust gas treatment device, and to release the restriction on the output and temporarily allow unrestricted output from the output generation device in response to an instruction to temporarily release the restriction on the output, the processor restricting the output while the engine is on; and
    a display controller that causes a display unit to display information that the restriction on the output is allowed to be temporarily released, with the output being restricted by the processor.

2. The work vehicle according to claim 1, wherein the display controller causes the display unit to alternately display a first image including output restriction information that the processor is restricting the output, and a second image including information that the restriction on the output is allowed to be temporarily released.

3. The work vehicle according to claim 1, wherein
    the allowable number of times for the temporary releasing of the restriction on the output is predetermined, and
    the display controller causes the display unit not to display the information that the restriction on the output is allowed to be temporarily released when the restriction on the output is not allowed to be temporarily released.

4. The work vehicle according to claim 1, wherein
    the allowable number of times for the temporary releasing of the restriction on the output is predetermined, and
    the display controller causes the display unit to display the allowable number of times for the temporary releasing of the restriction on the output.

5. The work vehicle according to claim 1, wherein
    the allowable amount of time for the temporary releasing of the restriction on the output is predetermined, and
    the display controller counts an amount of time the restriction on the output is temporarily released and causes the display unit to display remaining time information indicating remaining time the restriction on the output is allowed to be temporarily released.

6. A work vehicle including an internal combustion engine that generates power and an exhaust gas treatment device that treats exhaust gas emitted from the internal combustion engine, the work vehicle comprising:
    a detector that detects an abnormality of the exhaust gas treatment device;
    a processor programmed to restrict output of an output generation device including the engine of the work vehicle when the detector detects the abnormality of the exhaust gas treatment device, and to release the restriction on the output and temporarily allow unrestricted output from the output generation device in response to an instruction to temporarily release the restriction on the output, the processor restricting the output while the engine is on; and
    a display controller that causes a display unit to alternately display a first image including output restriction information that the processor is restricting the output, and remaining time until the output is restricted to the lowest state, and a second image including information that the restriction on the output is allowed to be temporarily released, with the output being restricted by the processor.

7. A work vehicle display device included in a work vehicle having: an internal combustion engine that generates power; an exhaust gas treatment device that treats exhaust gas emitted from the internal combustion engine; a detector that detects an abnormality of the exhaust gas treatment device; and
    a processor programmed to restrict output of an output generation device including the engine of the work vehicle when the detector detects the abnormality of the exhaust gas treatment device, and to release the restriction on the output and temporarily allow unrestricted output from the output generation device in response to an instruction to temporarily release the restriction on the output, the processor restricting the output while the engine is on, wherein
    the work vehicle display device displays information that the restriction on the output is allowed to be temporarily released, with the output being restricted by the processor.

8. The work vehicle display device according to claim 7, wherein the work vehicle display device displays alternately an image including information on the abnormality of the exhaust gas treatment device and an image including the information that the restriction on the output is allowed to be temporarily released.

9. The work vehicle display device according to claim 7, wherein
    the allowable number of times for the temporarily releasing of the restriction on the output is predetermined, and
    the work vehicle display device does not display the information that the restriction on the output is allowed to be temporarily released when the restriction on the output is not allowed to be temporarily released.

10. The work vehicle display device according to claim 7, wherein the allowable number of times for the temporary releasing of the restriction on the output is predetermined, and the work vehicle display device displays the allowable number of times for the temporary releasing of the restriction on the output.

11. The work vehicle display device according to claim 7, wherein the allowable amount of time for the temporary releasing of the restriction on the output is predetermined, and the display controller counts an amount of time the restriction on the output is temporarily released, and the work vehicle display device displays remaining time the restriction on the output is allowed to be temporarily released.

12. A work vehicle display device included in a work vehicle having: an internal combustion engine that generates power; an exhaust gas treatment device that treats exhaust gas emitted from the internal combustion engine; a detector that detects an abnormality of the exhaust gas treatment device; and a processor programmed to restrict output of an output generation device including the engine of the work vehicle when the detector detects the abnormality of the exhaust gas treatment device, and to release the restriction on the output and temporarily allow unrestricted output from the output generation device in response to an instruction to temporarily release the restriction on the output, wherein the work vehicle display device causes a display unit to alternately display a first image including output restriction information that the processor is restricting the output and remaining time until the output is restricted to the lowest state, and a second image including information that the restriction on the output is allowed to be temporarily released, with the processor being restricting on the output while the engine is on.

13. The work vehicle according to claim 1, wherein the abnormality comprises at least one of a reduction in an amount of remaining urea solution, an abnormality of a device that injects the urea solution, filter clogging, and an abnormality of a sensor.

14. The work vehicle according to claim 1, wherein a minimum restriction by the processor of the output of the engine of the output generation device is a low idle state.

* * * * *